United States Patent Office 3,786,128
Patented Jan. 15, 1974

3,786,128
PURIFICATION OF BERYLLIUM HYDRIDE
Jawad H. Murib, Stuart Schott, and Charles A. Bonecutter, Cincinnati, Ohio, assignors to National Distillers and Chemical Corporation, New York, N.Y.
No Drawing. Continuation-in-part of abandoned application Ser. No. 316,532, Oct. 16, 1963. This application Sept. 30, 1968, Ser. No. 763,970
Int. Cl. C01f 3/00
U.S. Cl. 423—122     6 Claims

ABSTRACT OF THE DISCLOSURE

Crude impure beryllium hydride is purified by reacting the hydride with a beryllium halide in the presence of a Lewis base to form a haloberyllium halide complex and disproportionating said complex.

---

This is a continuation-in-part of application Ser. No. 316,532 filed Oct. 16, 1963, and now abandoned.

Beryllium hydride is of considerable importance in powder metallurgy and in space and military applications as a high energy fuel component. Its insolubility in inert solvents, however, greatly hinders its being purified to the level required for its use. Previous attempts to obtain high purity beryllium hydride have not been successful. For example, impurities remained in the beryllium hydride obtained by the pyrolysis of di-t-butyl beryllium (prepared from Grignard reagent) at about 200° C. (G. E. Coats and F. Clockling, J. Chem. Soc., 1526 (1954), according to the equation.

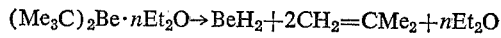

The removal of the impurities in the beryllium hydride obtained by the above method is difficult because of the insolubility of beryllium hydride in inert solvents.

The novel process of this invention provides a means for the purification of crude beryllium hydride prepared by conventional methods. The crude beryllium hydride is reacted with a beryllium halide in the presence of an inert solvent and a Lewis base in a closed system at a temperature within the range of about 0° to 100° C. and preferably within the range of about 25° C. to 85° C. to form a soluble haloberyllium hydride-Lewis base complex, filtering the product to remove any solid impurities and thereafter disproportionating the complex solution to precipitate pure beryllium hydride as illustrated by the following equations:

(1) 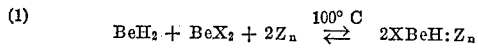

(2) 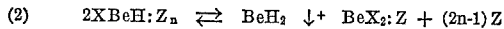

wherein X is a halogen selected from the group consisting of chlorine, bromine and iodine; Z is a Lewis base; and $n$ ranges between 0.5 and 2.

The disproportionation reaction in Equation 2 can be shifted to the right by employing any method that facilitates removal of the Lewis base from the system. For example, distillation of the Lewis base at any temperature between about 25° to 175° C. leads to formation of solid beryllium hydride. Vacuum distillation of the Lewis base from the reaction mixture permits operation at low temperatures, for example, between 50° and 100° C. However, when the disproportionation reaction is carried out in a closed system, i.e., without distillation of the Lewis base, high temperatures, i.e. above 100° C., are required to effect the disproportionation. It is preferred, however, to operate the disproportionation reaction (Eq. 2) at below 100° C. under vacuum in order to minimize incorporation of insoluble by-products in the final beryllium product. Thus, in the case of using diethyl ether as the Lewis base, the undesirable by-products include insoluble species derived from ether cleavage such as $XBeOC_2H_5$ and $HBEOC_2H_5$ Although these compounds are soluble in aromatic hydrocarbons, the occluded impurites could not be removed by extraction with these solvents. Therefore, it is preferred to employ temperatures at which cleavage of ether does not occur. In the case where the product $XBeH:OEt_2$ is prepared in aromatic hydrocarbons at relatively high temperatures, e.g. 100° C., any by-product of ether cleavage can be separated by stripping off the aromatic solvent and subsequent dissolution of the product in either followed by filtration of the insoluble impurities and finally by distilling off the excess ether thereby obtaining pure haloberyllium hydride-etherate.

The ratio of the amount of beryllium halide to the amount of the beryllium hydride should be at least 1:1. Higher ratios of the halide accelerate solubilization of the beryllium hydride, but tend to hinder its subsequent recovery via disproportionation of the haloberyllium hydride in accordance with the process of Equation 2. A ratio of beryllium chloride to beryllium hydride of 1:1 is preferred. At least 2 moles, and preferably 3 to 4 moles, of Lewis base are used per mole of beryllium halide.

The beryllium halide suitable for the practice of this invention can be beryllium chloride, beryllium bromide, or beryllium iodide. It is possible to use instead of the halide other salts such as the alkoxides, e.g., beryllium methoxide or beryllium isopropoxide; the mercaptides, e.g., beryllium ethyl mercaptide or beryllium isobutyl mercaptide; and the like. When these beryllium salts are used it is preferred to use aromatic hydrocarbons as media for the reaction of Eq. 1.

The Lewis base is an electron pair donor that does not contain an acidic hydrogen and can be selected from groups of dialkyl ethers such as dimethyl ether, diethyl ether, methylethyl ether, dipropyl ether, dibutyl ether, $\beta,\beta'$-dichloroethyl ether; diaryl ethers such as diphenyl ether, tolylphenyl ether and ditolyl ether; alkyl aryl ethers such as anisole and ethyl phenyl ether; dialkyl sulfides such as dimethyl sulfide, diethyl sulfide, n-propyl sulfide, di-n-butyl sulfide and ethyl methyl sulfide; tertiary amines such as trialkylamines (trimethylamine, triethylamine and tri-n-propylamine), pyridines (2-ethyl pyridine and 2-n-propyl pyridine), piperidines (n-methyl piperidine, n-ethyl piperidine and n-propyl piperidine); and dialkyl aryl amines (dimethyl aniline, diethyl aniline and ethyl methyl aniline). In instances where it is desired to carry out the disproportionation reaction in conjunction with the preparation of the haloberyllium hydride, the use of one of the weakers Lewis bases, e.g., diethyl ether, methylphenyl ether, and dimethyl sulfide, is preferred so that the beryllium hydride obtained in the disproportionation reaction (Eq. 2) does not complex with the Lewis base present.

The selected solvent should be a solvent both for the beryllium halide reactant and the haloberyllium hydride product and must be chemically inert to both the reactant and the product. It should also be relatively volatile to permit easy removal from the product. Suitable media include saturated aliphatic hydrocarbons and aromatic hydrocarbons, such as kerosene, hexane, nonane, isooctane, benzene, toluene, xylene, and mesitylene; inert chlorinated hydrocarbons, such as chlorobenzene, 2,4-dichlorotoluene, o- and p-chlorotoluene, o-chlorobenzene, p-dichlorobenzene, and o-oxylyl chloride; and halogenated acyclic hydrocarbons, such as trichloroethylene and methylene dichloride; and the like; and mixtures of these.

It is also possible to have one of the Lewis bases listed above serve as part or all of the solvent in the haloberyllium hydride formation reaction in which case an amount of Lewis base in excess of that required to complex the beryllium halide is employed.

In carrying out the disproportionation reaction it is preferred that the reaction medium have a higher boiling point than any Lewis base present in order to be able to selectively remove the Lewis base by distillation.

Any solvent and Lewis base used in the process of the present invention must be free from moisture and peroxides. The beryllium halides should be anhydrous in order to avoid hydrolysis of the active hydride which would result in poor yields and conversions as well as low reaction rates.

EXAMPLE 0.50 gram of impure solid beryllium hydride (58 wt. percent $BeH_2$) was treated with a solution of 3.70 g. (45.2 mmoles) of $BeCl_2$ and 11.5 g. (185 mmoles) of diethyl ether in 50 ml. of benzene at 50° C. until most of the initial beryllium hydride went into solution. The resulting solution was filtered to remove the insoluble impurities. The clear filtrate was heated at 75° C. with distillation of liberated diethyl ether and benzene. Heating was continued until evolution of diethyl ether ceased. The solid was slurried with benzene, filtered under an inert atmosphere, washed with dimethyl sulfide and dried by pumping in high vacuum at 100° C. The product was found by hydrolytic analysis to be 88 wt. percent beryllium hydride.

While this invention has been disclosed and illustrated by the above example, it will be understood that the invention is obviously subject to other modifications and variations without departing from its broader aspects.

What is claimed is:

1. A process for the purification of crude beryllium hydride which comprises the steps of
   (1) reacting in a closed system said crude beryllium hydride with a beryllium halide at a temperature in the range of 0° C. to 100° C. in the presence of a Lewis base which is free of protonic hydrogen to obtain in solution a haloberyllium hydride-Lewis base complex;
   (2) disproportionating said complex by removing Lewis base; and
   (3) recovering pure solid beryllium hydride.

2. The process of claim 1 wherein said Lewis base is selected from the group consisting of dialkyl ethers, diaryl ethers, alkyl aryl ethers, dialkyl sulfides and tertiary amines.

3. The process of claim 1 wherein said beryllium halide is beryllium chloride and said Lewis base is diethyl ether.

4. The process of claim 1 wherein at least two moles of Lewis base are used per mole of beryllium halide.

5. The process of claim 1 wherein the product of step (1) is filtered to remove solid impurities prior to step (2).

6. The process of claim 1 wherein the reaction of step (1) is carried out in the presence of an aromatic hydrocarbon solvent in addition to said Lewis base, stripping off the aromatic hydrocarbon solvent, dissolving the remaining product in an additional amount of Lewis base, filtering out any solid impurities present and distilling off excess Lewis base prior to step (2).

References Cited
UNITED STATES PATENTS 3,483,219   12/1969   Shepherd _____ 149—109 X LELAND A. SEBASTIAN, Primary Examiner U.S. Cl. X.R.

423—645; 149—109; 260—290 P, 293.51, 577, 583 R, 609 R, 612 R, 612 D, 614 R, 665 R